June 7, 1932.          H. A. HICKS                1,862,144
                      ENGINE COWLING
                    Filed June 25, 1930
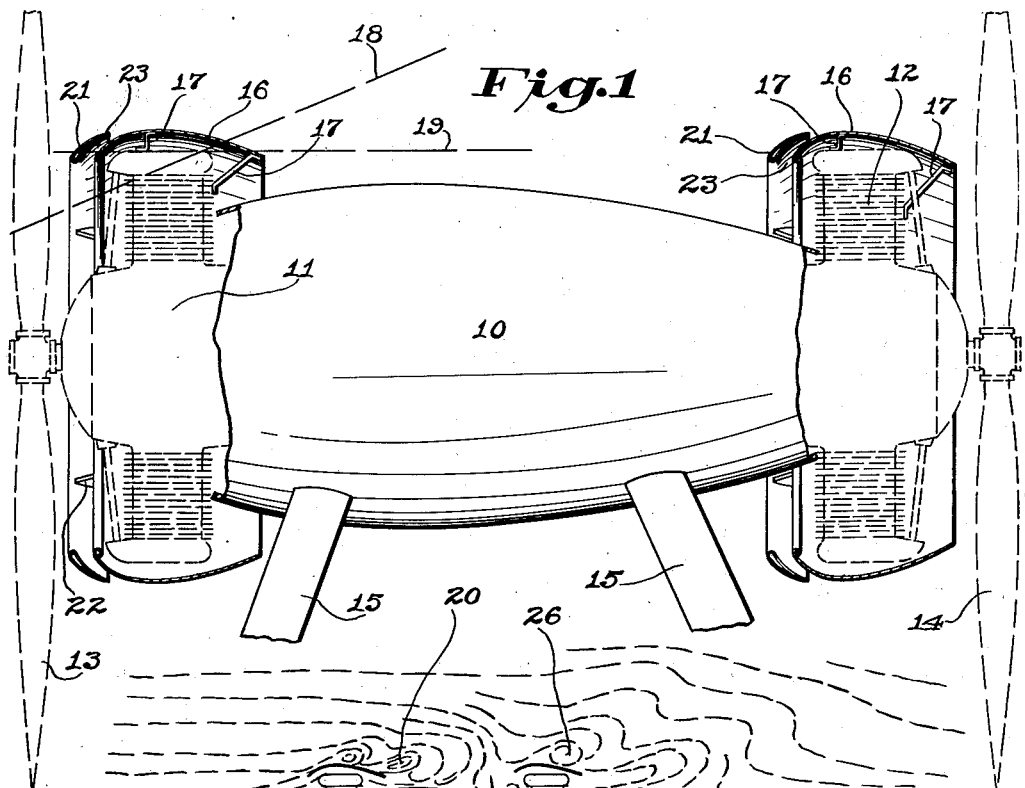
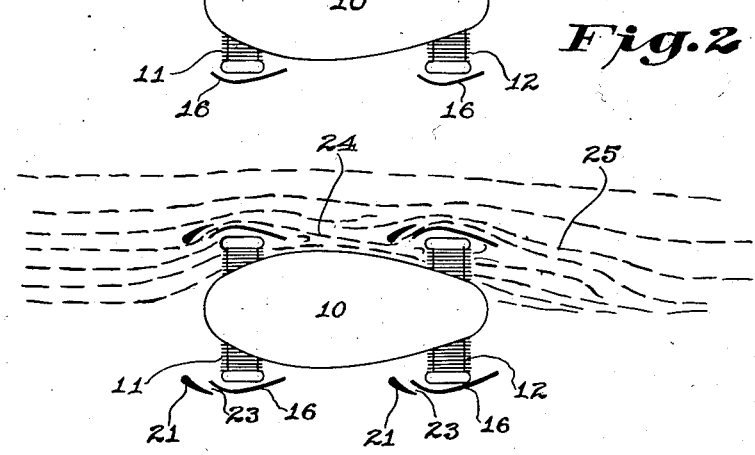
Witness.                                    INVENTOR.
E.C.McRae.                                  H. A. Hicks.
                              BY
                                            E.L. Davis
                                            ATTORNEY.

Patented June 7, 1932

1,862,144

UNITED STATES PATENT OFFICE

HAROLD A. HICKS, OF DETROIT, MICHIGAN, ASSIGNOR TO FORD MOTOR COMPANY, OF DEARBORN, MICHIGAN, A CORPORATION OF DELAWARE

ENGINE COWLING

Application filed June 25, 1930. Serial No. 463,675.

The object of my invention is to provide an engine cowling, particularly adapted for radial type air-cooled airplane engines, which cowling will reduce the air drag of the engines to a minimum.

Still a further object of my invention is to provide an engine cowling for air-cooled airplane engines especially useful in tandem installations, which cowling will provide a uniform air velocity against the cooling fins of both the front and rear engines.

Still a further object of my invention is to provide an engine cowling which will reduce the horsepower required for cooling the engines to thereby produce a gain in efficiency. Only about 40 per cent of the energy developed by the ordinary radial air-cooled engine is converted into useful work, the remaining energy being dissipated in heat which is radiated from the engine cylinders. The radiation of heat from such cylinders is approximately proportional to the velocity of the cooling air passing around the cylinders so that the engines on high speed airplane installations are cooled more than is necessary, which excess cooling greatly lowers their efficiency. The function of my improved cowling is to restrict or lessen the portion of the propeller slip stream which flows around the engine cylinders so that the engine is allowed to run hotter and thereby increase its efficiency.

In the ordinary tandem engine installation the forward engine is cooled far too much while the rear engine is not cooled sufficiently. With my improved cowling the air flow is diverted so that the forward engine is allowed to run somewhat hotter than in the ordinary case, while the rear engine is cooled much more than was heretofore possible so that each engine may operate at its maximum efficiency. A reduction in the energy lost through cooling is thereby obtained with my cowling and further, this cowling eliminates to a large extent the air drag of these engines so that the percentage of energy converted into useful horsepower is further increased.

I obtain these beneficial results by placing a thin metallic ring encircling the outer ends of the engine cylinders which ring is disposed at a relatively large angle of attack to the air stream of the propeller so as to cause an inwash of the air towards the rear engine cylinders. It may be readily seen that this ring is in line with the center of the slip stream and that each section of the ring, due to its angle of attack, tends to move outwardly, which movement is, of course, resisted by the inherent strength of the ring. The air stream directly in the rear of the ring is deflected downward so that it flows evenly to the cylinders of the rear engine.

It is well known that increasing the angle of attack of an airfoil section increases the bending of the lines of flow downwardly in the rear of the section thereby producing a greater lift. My ring cowling being disposed around the engine there is, of course, no resultant lift on the plane; however, the bending of the lines of flow inwardly toward the center of the ring does accomplish two important objects, the first being that this bending or downwash straightens out the lines of flow back of the front engine and secondly, the air is thus brought inwardly to effectively cool the inner portions of the rear engine cylinders in a tandem installation. The advantage of this structure is that my main ring may be set at a high angle of attack and still the air flow will be deviated in a smooth even current to the rear engine, in fact, the high angle of attack at which my cowling is set would cause stalling of my main ring if it were used alone. Thus, I am able to fill the void in the rear of the front engine to thereby lessen the drag thereof much more efficiently than if the downwash was dependent upon the maximum angle of incidence of the main ring only. Further, I am enabled to place the rear engine of a tandem installation much farther forward and thus lighten the nacelle structure. This last advantage is possible because the lines of flow having a greater downwash will necessarily intersect the nacelle very close in the rear of the front engine. This even inwash of air is essential and is the means by which the air drag is greatly reduced.

For structural reasons, it is obvious that a fixed angle of attack must be incorporated in the ring which angle functions properly to cool the rear engine cylinders only at a predetermined air speed. A large angle or high lift coefficient is very desirable in this connection as it draws the air inwardly at the rear thereof so that it flows uniformly along the engine nacelle.

When a ring having a high lift coefficient is set at a stalled angle, the velocity of the air over the outer surface of the ring is reduced so that the pressure gradient on the outer surface increases to such an extent that the air is no longer able to follow the contour of the ring, but leaves it and violent disturbances occur in the flow of the air above the ring. The detrimental effect of such turbulence arises because an enormous drag is produced and further, the turbulent air in the wake of the forward engine is of very low velocity so that under such conditions the rear engine receives very inefficient cooling. The drag occurring when such turbulence is present reduces the efficiency of the airplane materially.

The feature which distinguishes my engine cowling from all other types of cowling, of which I am familiar, is that I provide an auxiliary ring disposed forwardly of the above described main ring which increases the angle of attack at which turbulence begins, due to the break down of air flow over the outer surface of the ring. I am thus able to use a ring having a much higher lift coefficient than would otherwise be possible. With my device, even at a high angle of attack, the air currents are deflected inwardly towards the rear engine cylinders to thereby efficiently cool this engine.

In tandem installations I prefer to use an identical ring construction on each engine so that at low operating speeds the air drag from the rear engine will be reduced, due to the inwash created by the rear ring.

With these and other objects in view, my invention consists in the arrangement, construction and combination of the various parts of my improved device, as described in the specification, claimed in my claims, and illustrated in the accompanying drawing, in which:

Figure 1 shows a vertical, central, sectional view through my improved engine cowling, a tandem engine nacelle being shown.

Figure 2 shows a diagrammatic view of the installation shown in Figure 1, illustrating the turbulence created by an ordinary cowling operating at a speed wherein burbling occurs, and Figure 3 shows a diagrammatic view of my improved cowling illustrating the smooth air-flow provided by my improved device when operating under conditions causing turbulence with a plain ring.

Referring to the accompanying drawing, I have used the reference numeral 10 to designate an engine nacelle having a radial air-cooled engine 11 secured to the forward end thereof and a similar engine 12 secured to the rear end thereof.

The forward engine 11 is provided with a tractor propeller 13, and the rear engine 12 is likewise provided with a pusher propeller 14. The nacelle 10, in this particular installation, is supported above the main wing section of the airplane by struts 15, but it will be understood that such nacelle may be suspended beneath the wing or placed in any other convenient position without departing from the spirit of this invention. In fact, the engines may be mounted directly on the airplane wings if desired.

Each of the engines 11 and 12, is provided with an annular cowling member 16 which completely encircles the outer ends of the engine cylinders. This cowling can be made from sheet metal or cast, as desired, and is secured in its place by a plurality of braces 17 extending from the individual engine cylinders. The cross-section of the cowling 16 shows a camber, although a straight section may be desirable in some installations.

The engine cylinders normally deflect the slip stream of the propeller 13 outwardly in a cone shaped path in the direction shown by the dotted lines 18, so that each section of the ring operates at a large angle of attack to the air stream so set up. The plane of the ring section follows the dotted line 19 which may be seen to form an angle with the line 18. An outward lift is produced by the ring section which lift causes an inwash of the air stream toward the surface of the engine nacelle 10.

Referring to Figure 2, I have shown a diagrammatic view of an engine nacelle having a forward and rear engine, 11 and 12 respectively, these engines being equipped with a pair of the annular rings 16 just described. Each of these ring sections extends substantially perpendicular to the engine propellers but, as the slip stream of the propeller is deflected outwardly by the center portion of the engine and nacelle, the effective angle of attack of this ring with the slip stream is quite large. This large angle of attack is necessary to cause an inwash of the air stream in the rear of the forward ring toward the nacelle 10. When the ring is set at a high enough angle of attack to cause an abrupt downwash against the lower portion of the rear engine cylinders, turbulence occurs over the outer surface of the ring and it may then be said to be operating in a stalled condition. Turbulent air currents, as shown by dotted lines 20, occur back of the forward ring when such stalling occurs, which causes the air to be practically stagnant in front of the rear engine. The rear engine under such conditions cannot be cooled sufficiently by the practically stagnant air current so that if the forward ring is set at such angle the rear engine undoubtedly would burn-up. Further, the turbulent air current, as illustrated by the dotted lines 26 in the rear of the second ring 16, cause an enormous drag which in effect increases the horsepower required to cool the engines.

To overcome the stalling of my improved cowling at a high angle of attack, I provide an auxiliary ring 21 having a relatively narrow chord secured just forwardly of each ring 16 by suitable bracket 22. An annular space 23 is provided between the ring 16 and the auxiliary ring 21 which allows a portion of the slip stream to flow therethrough. A continuity of air flow over the surface of the ring 16 is obtained due to the higher velocity of the air flowing through the space 23. The air passing through the space 23 flows at a greater velocity than the general air stream because of the shape of the space 23 so that stalling of the main ring is prevented. It will be noted that the cross section through the rear portion of the space 23 is of less area than the forward portion so that a nozzle effect is obtained to increase the air velocity over the outer surface of the main ring.

I am thus able to provide a large angle of attack for the ring 16, the auxiliary ring preventing stalling of the main ring due to this high angle. It will be seen from Figure 3 that the flow of air rearwardly of the forward ring 16 follows the direction of the dotted lines 24, the air velocity adjacent to the nacelle 10 being substantially the same as the slip stream velocity. It is thus evident that the use of the ring 16, together with the auxiliary ring 21, makes the air stream conform to the shape of the engine nacelle so that the drag of the device is the same as if the forward engine were not added to the nacelle. As the velocity of the air at 24 is substantially the same as the slip stream, the function of the rear ring 16 and rear auxiliary ring 21 is the same as the forward rings. A down-wash is created by this rear ring 16 which is illustrated by dotted lines 25 so that the total drag of the two engines and nacelle is only very little more than the drag created by the nacelle alone. Contrasting this result with the drag created by the engines and nacelles where no rings are used or where a single ring is used, it will be apparent that the total drag of my improved device is only a fraction of the drag of these other installations. The horsepower for cooling my engines, which horsepower is the sum of the heat lost by cooling plus the air drag created by the engines, is therefore materially reduced with my improved cowling.

It will be kept in mind that no attempt is made to increase the air velocity of the forward engine by the use of my improved cowling, but on the contrary the velocity of the slip stream around the cylinders of this engine is materially reduced. However, the ordinary airplane engine is designed with cooling fins sufficient to cool the engine under normal conditions so that my improved cowling simply reduces the heat lost through cooling, to thereby operate the engine at a more efficient temperature. The rear engine of my improved structure is cooled more efficiently than the rear engine in a tandem installation wherein no cowling is used. In fact, this engine is cooled substantially the same as the forward engine so that both of these engines operate at an efficient temperature.

The advantages of my improved engine cowling may be summed up briefly as follows:

An improved operating temperature is maintained for both the front and the rear engines, the front engine being allowed to operate at a somewhat higher temperature than formerly, and the rear engine being cooled to a much greater extent than was formerly possible. Further, the drag produced by both of the engines combined is only slightly greater than that which would normally be produced by the engine nacelle alone so that the power loss through this device is materially reduced.

Some changes may be made in the arrangement, construction and combination of the various parts of my new device without departing from the spirit of my invention, and it is my intention to cover by my claims, such changes as may reasonably be included within the scope thereof.

I claim as my invention:

1. In an air cooled airplane engine cowling, an annular main ring encircling the outer ends of the engine cylinders, and an auxiliary ring spaced forwardly from said main ring preventing turbulence in the wake thereof, the angle of attack of said main ring and the spacing of said auxiliary ring being so disposed that a greater flow deviation in the rear of the main ring is produced than would be possible with only the main ring.

2. In a device adapted to reduce the drag of a member immersed in an air stream, a main airfoil located at the immersed end of said member having an angle of incidence with the air stream greater than the stalling angle of said airfoil, and an auxiliary airfoil spaced forwardly from said main airfoil in position to maintain the air flow over the main airfoil at said stalled angle, whereby an increased downwash of air is produced to fill the void at the rear of said member.

3. In a device adapted to reduce the drag of a member immersed in an air stream, a main airfoil disposed in the air stream adjacent to said member having an angle of incidence with the air stream greater than stalling angle of said airfoil, and an auxiliary airfoil spaced forwardly from said main airfoil in position to maintain the air flow over the main airfoil at said stalled angle, whereby an increased downwash of air is produced to fill the void in the rear of said member.

4. In a device adapted to reduce the drag of a member immersed in an air stream, a main airfoil substantially covering the immersed end of said member having an angle of incidence with the air stream greater than the stalling angle of said airfoil, and an auxiliary airfoil spaced forwardly from said main airfoil in position to maintain the air flow over the main airfoil at said stalled angle, whereby an increased downwash of air is produced to fill the void in the rear of said member.

5. In a device adapted to reduce the drag of a member immersed in an air stream, a main airfoil disposed in the air stream adjacent to said member having an angle of incidence with the air stream greater than the stalling angle of said airfoil, and an auxiliary airfoil spaced forwardly from the leading edge of the main airfoil with its rear edge nearer to the main airfoil than its forward edge to thereby produce a nozzle effect whereby an increased velocity of the air over the main airfoil results to thus maintain the air flow at said stalled angle and create an increased downwash of air to fill the void in the rear of said member.

6. In a device adapted to reduce the drag of a member immersed in an air stream, a main airfoil substantially covering the immersed end of said member having an angle of attack with the slip stream greater than the stalling angle of said airfoil, and an auxiliary airfoil spaced forwardly from the forward edge of said main airfoil in such a position that the velocity of the air flowing between said airfoils is increased to thereby increase the flow over the main airfoil and thus maintain the air flow at said stalled angle, whereby an increased downwash of air is produced to fill the void in the rear of said member.

7. In a device adapted to reduce the drag of a portion of an airplane engine immersed in an air stream, a main airfoil disposed adjacent to said portion having an angle of attack with the air stream greater than the stalling angle of said airfoil, and an auxiliary airfoil spaced forwardly from said main airfoil so as to obtain a nozzle-shaped space therebetween, the air flowing through said nozzle having an increased velocity to thereby maintain the air flow over said main airfoil at said stalled angle, whereby an increased downwash is produced to fill the void in the rear of the engine.

8. In a device adapted to reduce the drag of air cooled engine cylinders, a main airfoil spaced from the outer end of said cylinders and supported thereby having a normal angle of attack with the air stream greater than the stalling angle of said airfoil, and an auxiliary airfoil spaced forwardly from said main airfoil so as to obtain a nozzle-shaped space therebetween, the air flowing through said nozzle having an increased velocity to thereby maintain the air flow over the main airfoil at said stalled angle, whereby an increased downwash of air is produced to fill the void in the rear of said cylinders.

9. In a device adapted to reduce the drag of air cooled engine cylinders, a main airfoil substantially covering the exposed ends of said cylinders and supported thereby having an angle of attack with the air stream greater than the stalling angle of said airfoil, and an auxiliary airfoil spaced forwardly from the forward edge of the main airfoil and supported thereby so as to obtain a nozzle-shaped space therebetween, the air flowing through said nozzle flowing with an increased velocity over the back of the main airfoil to thereby maintain the air flow at said stalled angle, whereby an increased downwash of air is produced to fill the void in the rear of said cylinders.

10. In a device adapted to reduce the drag in an air cooled radial type engine, a main airfoil disposed at the outer ends of each engine cylinder having an angle of attack with the propeller slip stream greater than the stalling angle of said airfoils, and auxiliary airfoils each spaced forwardly from the leading edge of one of the main airfoils in position to increase the velocity of air over its adjacent main airfoil and thus maintain the air flow at said stalled angle, whereby an increased inwash of air is produced to more efficiently fill the void in the rear of said engine.

11. In a device adapted to reduce the drag of an air cooled radial type engine, a main arcuate-shaped member of airfoil section encircling at least a portion of the engine cylinders, the individual airfoil sections of said member being set at an angle of attack with the propeller slip stream greater than the stalling angle thereof, and an arcuate-shaped auxiliary member of airfoil section secured in position forwardly from said main section to thereby increase the velocity of air over the main airfoil member to prevent stalling, whereby an increased downwash of air is produced to fill the void in the rear of said engine.

12. In a device adapted to reduce the drag of an air cooled radial type engine, a ring of airfoil section encircling the outer ends of the engine cylinders, the individual airfoil sections of said ring being set at an angle of attack with the propeller slip stream greater than the stalling angle thereof, and an auxiliary ring of airfoil section secured in position spaced forwardly from said main section, whereby an increased downwash of air is produced to fill the void in the rear of said engine.

13. In a device adapted to reduce the drag of an air cooled radial type engine, a ring of airfoil section encircling the outer ends of the engine cylinders in the plane thereof, the individual airfoil sections of said ring being set at an angle of attack with the propeller slip stream greater than the stalling angle thereof, and an auxiliary ring of airfoil section secured in position spaced forwardly from said main ring and supported entirely thereby, whereby an increased downwash of air toward the axis of said engine is produced to fill the void in the rear thereof.

14. In a device adapted to reduce the drag of an air cooled radial type engine, a ring of airfoil section encircling the outer ends of the engine cylinders in the plane thereof, the individual airfoil sections of said ring being set at an angle of incidence with the propeller slip stream greater than the stalling angle thereof, and an auxiliary ring of airfoil section spaced forwardly from said main ring so as to obtain a nozzle-shaped space therebetween, the air flowing through said nozzle flowing with an increased velocity over the back of the main airfoil to thereby maintain the air flow at said stalled angle, whereby an increased downwash of air is produced to fill the void in the rear of said engine cylinders.

15. In an airplane, an engine nacelle having a radial type air cooled engine secured at each end thereof, main arcuate-shaped members of airfoil section encircling at least a portion of the cylinders of each engine, the individual airfoil sections of the forward of said members being set at an angle of incidence with the propeller slip stream and the rearward of said members set at an angle of incidence with the air flow from the forward member, both of said angles being greater than the stalling angles of said members, and arcuate-shaped auxiliary members of airfoil section secured in positions forwardly of said main members and spaced therefrom to thereby increase the velocity of the air over the main members and prevent stalling thereof, whereby an increased downwash of air is produced to fill the void in the rear of the rearmost engine and to provide a smooth air current for cooling the said rear engine.

16. In an airplane, an engine nacelle having a radial type air cooled engine disposed at each end thereof, a main ring disposed around the cylinders of each of said engines, the individual portions of each of said rings being set at an angle of attack with the adjacent air stream greater than the stalling angle of said rings, and an auxiliary ring of airfoil section disposed forwardly of each of said main rings, thereby increasing the flow of air over the main rings to thus prevent stalling of said rings.

17. In an airplane, an engine nacelle having a radial type air cooled engine disposed at each end thereof, a main ring member of airfoil section encircling at least a portion of the engine cylinders of each engine, the angle of incidence of each ring being greater than the stalling angle thereof, and auxiliary rings each secured in position spaced forwardly from the main rings, the spaces therebetween forming nozzles to increase the velocity of air over the main ring, whereby an increased downwash of air is produced to fill the void in the rear of the forward engine and produce a uniform flow of air to cool the cylinders of the rear engine.

18. In an airplane, an engine nacelle having a radial type air cooled engine disposed at each end thereof, a main ring of airfoil section disposed around the cylinders of each engine in the plane thereof, and secured thereto in the plane of the cylinders, each element of each ring being secured at an angle of incidence with the incoming air greater than the stalling angle thereof, and auxiliary rings of airfoil section each spaced forwardly from one of the main rings and over-lapping the forward edge thereof, the spaces between said forward edges and auxiliary airfoils being of gradually diminishing section rearwardly whereby a nozzle effect is produced to increase the velocity of air over the said main airfoils and prevent stalling thereof.

19. In an airplane, an engine nacelle having a radial type air cooled engine disposed at each end thereof, a main ring disposed around the cylinders of each of said engines in the planes thereof the individual portions of said rings being set at angles of attack greater than the stalling angles thereof, and auxiliary rings spaced forwardly from said main rings, the spaces between the leading edges of the main rings and the auxiliary rings being of gradually diminishing section rearwardly whereby a nozzle effect is obtained to increase the velocity of air over the main rings and prevent stalling thereof.

HAROLD A. HICKS.